(12) United States Patent
Su et al.

(10) Patent No.: US 11,814,138 B1
(45) Date of Patent: Nov. 14, 2023

(54) REAR DERAILLEUR (71) Applicant: AD-II Engineering Inc., Taichung (TW)

(72) Inventors: Chien-Hao Su, Taichung (TW); Yu-Hsuan Cheng, Taichung (TW); Kai-Hung Hu, Taichung (TW)

(73) Assignee: AD-II ENGINEERING INC., Taichung (TW)

( * ) Notice: Subject to any disclaimer, the term of this patent is extended or adjusted under 35 U.S.C. 154(b) by 0 days.

(21) Appl. No.: 17/852,161

(22) Filed: Jun. 28, 2022

(51) Int. Cl.
*B62M 9/16* (2006.01)
*B62M 9/126* (2010.01)
*B62M 9/124* (2010.01)

(52) U.S. Cl.
CPC ............. *B62M 9/16* (2013.01); *B62M 9/126* (2013.01); *B62M 2009/12406* (2013.01)

(58) Field of Classification Search
CPC ...... B62M 9/126; B62M 9/122; B62M 9/121; B62M 9/1242; B62M 9/1244; B62M 9/1248; B62M 2009/12406; B62M 9/16
USPC ...................................................... 474/80, 82
See application file for complete search history.

(56) References Cited

U.S. PATENT DOCUMENTS

| | | | | |
|---|---|---|---|---|
| 4,406,643 A * | 9/1983 | Shimano | ............. | B62M 9/1248 474/82 |
| 4,530,677 A * | 7/1985 | Nagano | ................. | B62M 9/126 474/82 |
| 6,135,904 A * | 10/2000 | Guthrie | ................. | B62M 9/122 474/82 |
| 6,394,921 B1 * | 5/2002 | Fukuda | ................. | B62M 9/126 474/82 |
| 8,852,041 B2 * | 10/2014 | Yamaguchi | ............ | B62M 9/126 474/80 |
| 8,870,692 B2 * | 10/2014 | Yamaguchi | ............ | B62M 9/126 474/80 |
| 9,463,846 B1 * | 10/2016 | Chang | ................. | B62M 9/1248 |
| 10,086,904 B2 * | 10/2018 | Lin | ........................ | B62M 9/124 |
| 11,098,787 B2 * | 8/2021 | Ziegler | ............... | F16F 15/1292 |
| 11,577,804 B2 * | 2/2023 | Braedt | ................... | B62M 9/121 |
| 11,649,875 B2 * | 5/2023 | Brown | ...................... | F16F 9/10 267/64.11 |
| 2006/0116227 A1 * | 6/2006 | Mercat | ..................... | B62M 9/12 474/82 |
| 2009/0054183 A1 * | 2/2009 | Takachi | .................. | B62M 9/121 474/80 |
| 2012/0083371 A1 * | 4/2012 | Yamaguchi | ............ | B62M 9/126 474/80 |
| 2012/0083372 A1 * | 4/2012 | Yamaguchi | ............ | B62M 9/126 474/80 |
| 2013/0090196 A1 * | 4/2013 | Yamaguchi | .......... | B62M 9/1244 474/80 |
| 2013/0310204 A1 * | 11/2013 | Shahana | ................ | B62M 9/121 474/80 |

(Continued)

*Primary Examiner* — Henry Y Liu
(74) *Attorney, Agent, or Firm* — Muncy, Geissler, Olds & Lowe, P.C.

(57) ABSTRACT

A rear derailleur is provided, including: a base, configured to be mounted to a bicycle; a movable member, movably disposed on the base; a shaft, rotatably connected to the movable member; a chain guide, connected to the shaft; a biasing member, disposed between the chain guide and the movable member; a resistance mechanism, connected to the movable member to apply frictional resistance to the shaft.

9 Claims, 6 Drawing Sheets

(56) References Cited

U.S. PATENT DOCUMENTS

| | | | | |
|---|---|---|---|---|
| 2014/0162817 | A1* | 6/2014 | Yamaguchi | B62M 25/08 474/80 |
| 2014/0162818 | A1* | 6/2014 | Yamaguchi | B62M 9/1242 474/80 |
| 2014/0213397 | A1* | 7/2014 | Yamaguchi | B62K 23/04 474/80 |
| 2014/0296009 | A1* | 10/2014 | Suyama | B62M 9/122 474/80 |
| 2015/0031483 | A1* | 1/2015 | Yamaguchi | B62M 9/1242 474/80 |
| 2016/0046352 | A1* | 2/2016 | Shipman | B62M 9/16 29/428 |
| 2016/0176478 | A1* | 6/2016 | Chang | B62M 9/126 474/69 |
| 2016/0304161 | A1* | 10/2016 | Shirai | B62M 9/16 |
| 2016/0375959 | A1* | 12/2016 | Calendrille, Jr. | B62M 9/124 474/122 |
| 2017/0113760 | A1* | 4/2017 | Lin | B62M 9/1248 |
| 2017/0174289 | A1* | 6/2017 | Wu | B62M 9/16 |
| 2017/0283004 | A1* | 10/2017 | Calendrille | B62M 9/121 |
| 2017/0343063 | A1* | 11/2017 | Chan | B62M 9/00 |
| 2017/0355423 | A1* | 12/2017 | Celi | B62M 9/1244 |
| 2018/0148129 | A1* | 5/2018 | Bernardele | B62M 9/1248 |
| 2018/0244345 | A1* | 8/2018 | Yamaguchi | B62M 9/122 |
| 2018/0273139 | A1* | 9/2018 | Shipman | B62M 9/126 |
| 2018/0274623 | A1* | 9/2018 | Brown | F16F 9/10 |
| 2018/0346058 | A1* | 12/2018 | Brown | B62M 9/126 |
| 2018/0370598 | A1* | 12/2018 | Chang | B62M 9/128 |
| 2019/0047660 | A1* | 2/2019 | Yang | B62M 9/1248 |
| 2019/0061877 | A1* | 2/2019 | Suyama | B62M 25/02 |
| 2019/0063547 | A1* | 2/2019 | Ziegler | B62M 9/124 |
| 2019/0329842 | A1* | 10/2019 | Calendrille, Jr. | B62M 9/1244 |
| 2020/0062344 | A1* | 2/2020 | Liao | B62M 9/1242 |
| 2020/0130779 | A1* | 4/2020 | Ma | B62M 9/125 |
| 2020/0166089 | A1* | 5/2020 | Choltco-Devlin | F16D 41/16 |
| 2021/0039748 | A1* | 2/2021 | Braedt | B62M 9/128 |
| 2021/0070394 | A1* | 3/2021 | Fukumori | B62M 6/45 |
| 2021/0070396 | A1* | 3/2021 | Garcia | B62M 9/125 |
| 2021/0362805 | A1* | 11/2021 | Ziegler | B62M 9/16 |
| 2022/0144380 | A1* | 5/2022 | Hu | B62M 9/16 |
| 2022/0177076 | A1* | 6/2022 | Peruzzo | B62M 9/1248 |

* cited by examiner

REAR DERAILLEUR

BACKGROUND OF THE INVENTION

Field of the Invention

The present invention relates to a rear derailleur.

Description of the Prior Art

The shifting mechanism is designed to be capable of being shifted with many speeds by utilizing the rear derailleur to move the chain to pull the chain to shift between multiple sprockets. In installation of the derailleur, the biasing member is set to provide resistance to restrain counterclockwise rotation of the derailleur, to tighten the chain to avoid the problem of the chain falling off.

However, in the wild, mountain road, and riding on bumpy roads, the resistance provided by the biasing member is insufficient to counteract the active force due to the rapid shaking and strong impact, so that the chain guide will swing counterclockwise, which will cause chain slacking and chain throwing.

The present invention is, therefore, arisen to obviate or at least mitigate the above-mentioned disadvantages.

SUMMARY OF THE INVENTION

The main object of the present invention is to provide a rear derailleur which can effectively prevent chain slacking and chain throwing.

To achieve the above and other objects, a rear derailleur is provided, including: a base, configured to be mounted to a bicycle; a movable member, rotatably connected to the base; a shaft, rotatably connected to the movable member; a chain guide, connected to the shaft; a biasing member, disposed between the chain guide and the movable member; and a resistance mechanism, connected to the movable member and configured to apply a frictional resistance to the shaft, including at least one biasing unit, a clutch assembly and a friction applying assembly, the clutch assembly including a first clutch member and a second clutch member which are relatively rotatable, the first clutch member including at least one first abutting portion, the second clutch member including at least one second abutting portion, the at least one first abutting portion and the at least one second abutting portion being abutted against each other in an axial direction of the shaft, one of the first clutch member and the second clutch member being connected to and movable with the shaft; wherein when the chain guide drives the shaft to rotate in a predetermined direction, an axial extent of the clutch assembly shortens, and the at least one biasing unit applies a first resisting force to the clutch assembly and the friction applying assembly, and when the chain guide drives the shaft to rotate in a direction opposite to the predetermined direction, the axial extent of the clutch assembly elongates, and the at least one biasing unit applies a second resisting force to the clutch assembly and the friction applying assembly, wherein the second resisting force is larger than the first resisting force.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
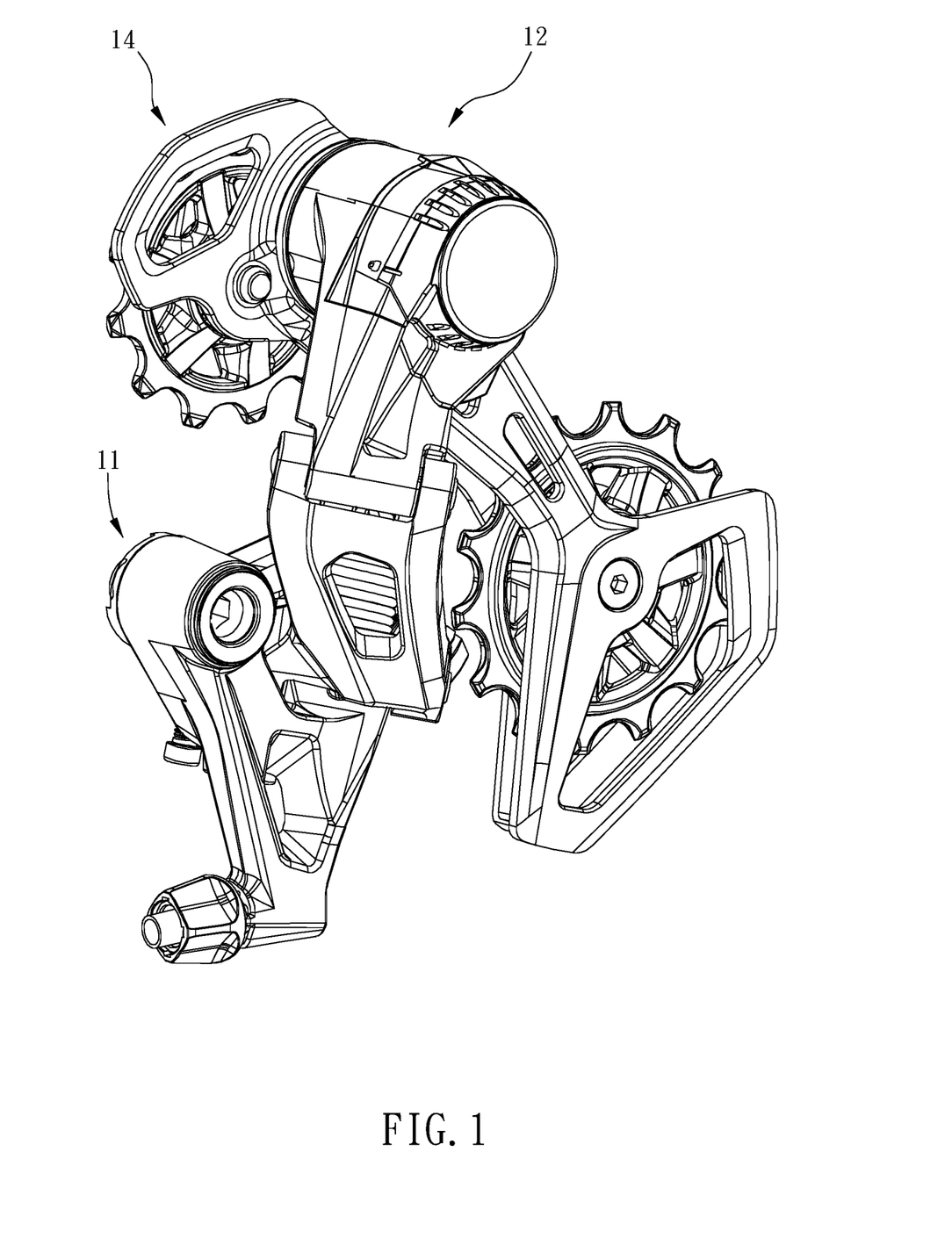
FIG. 1 is a stereogram of a preferable embodiment of the present invention.
Figure 2:
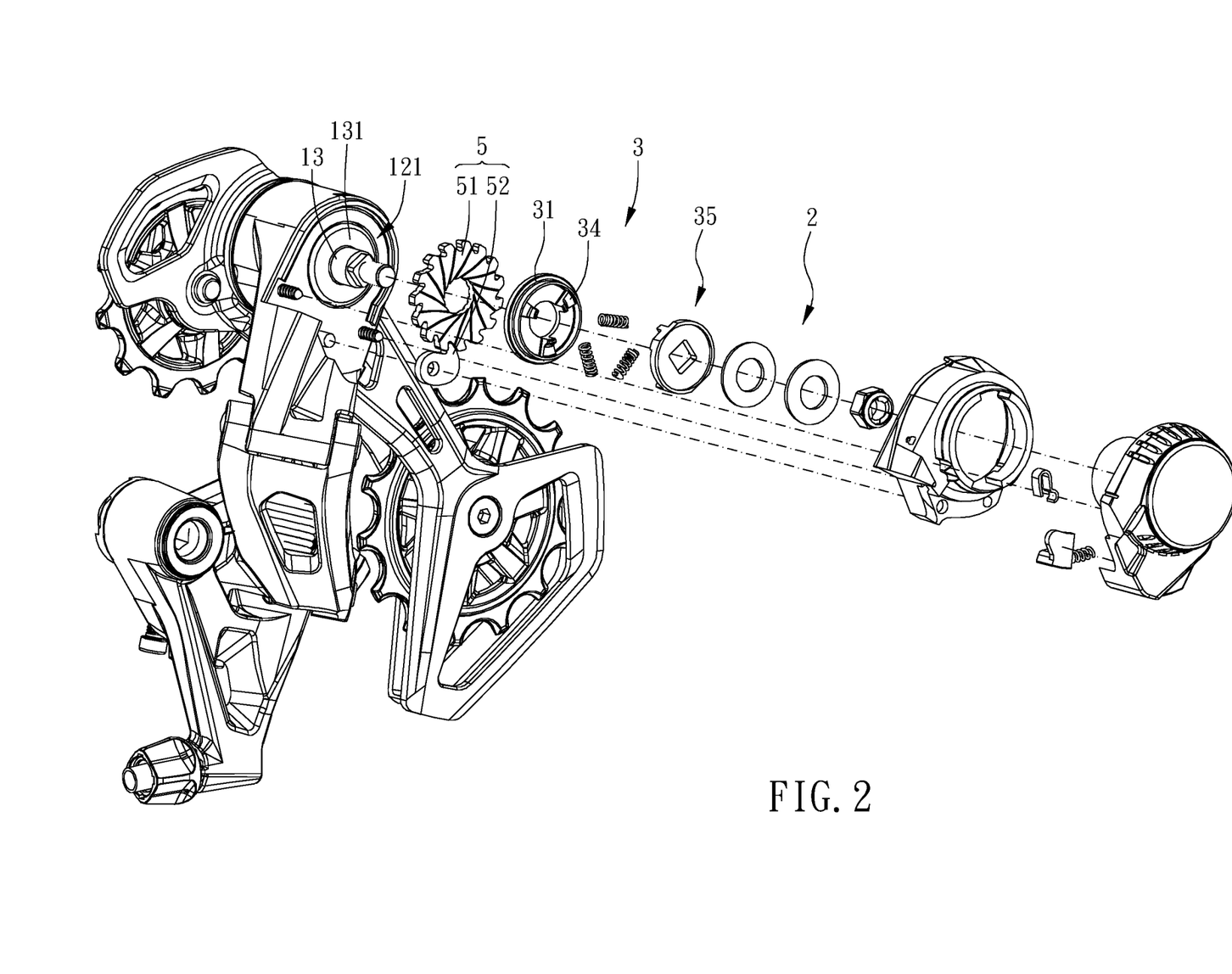
FIG. 2 is a partial breakdown drawing of a preferable embodiment of the present invention.
Figure 3:
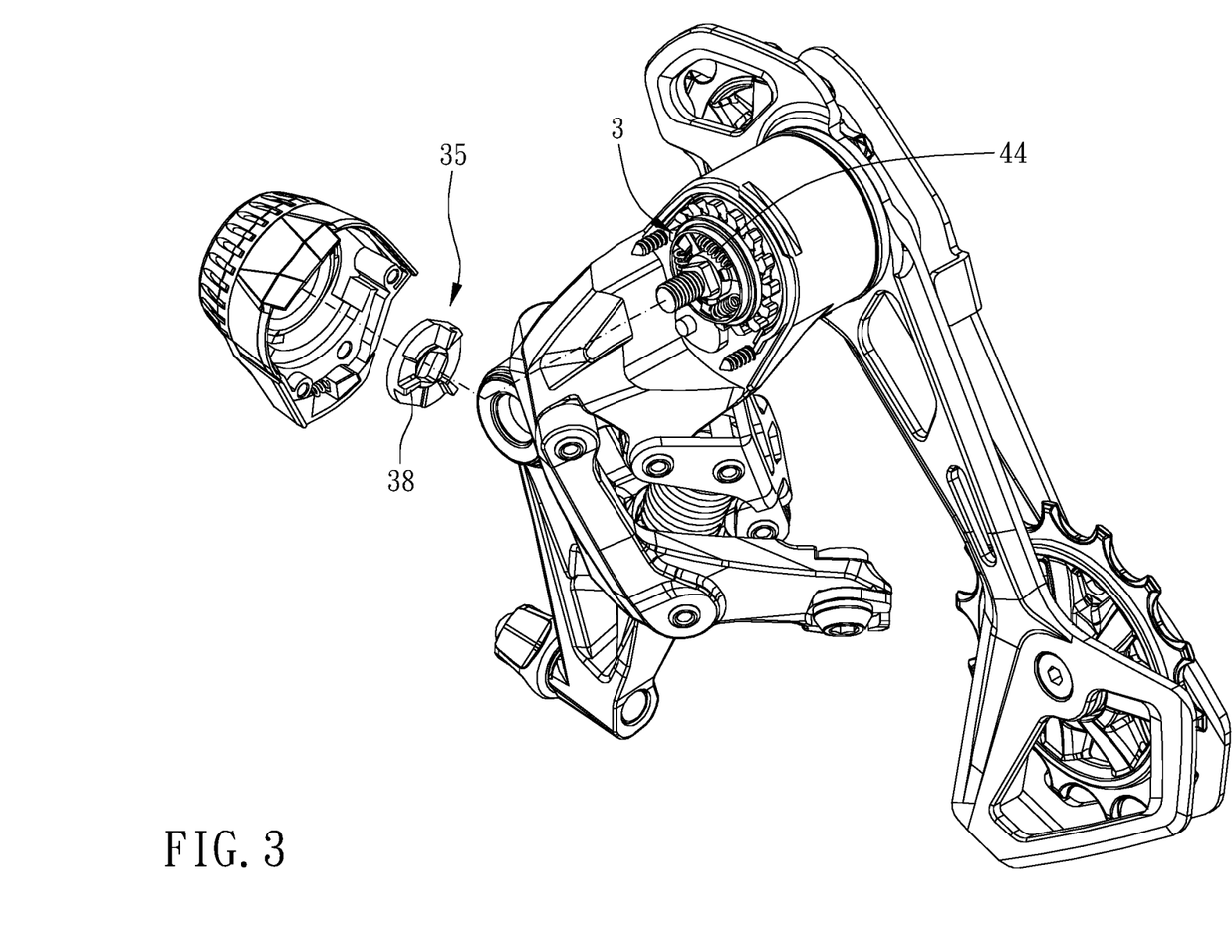
FIG. 3 is another partial breakdown drawing of a preferable embodiment of the present invention.
Figure 4:
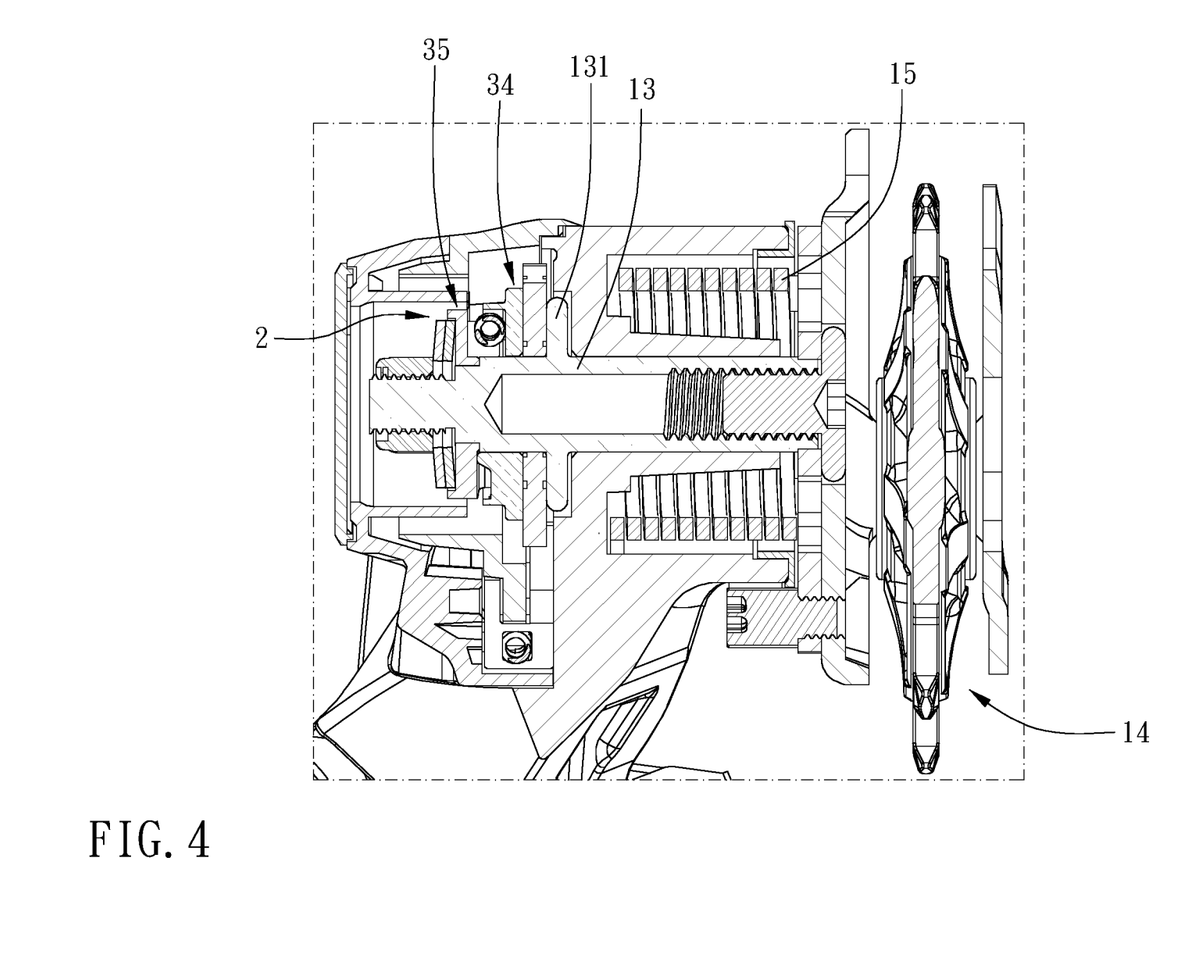
FIG. 4 is a first partial cross-sectional view of a preferable embodiment of the present invention.
Figure 5:
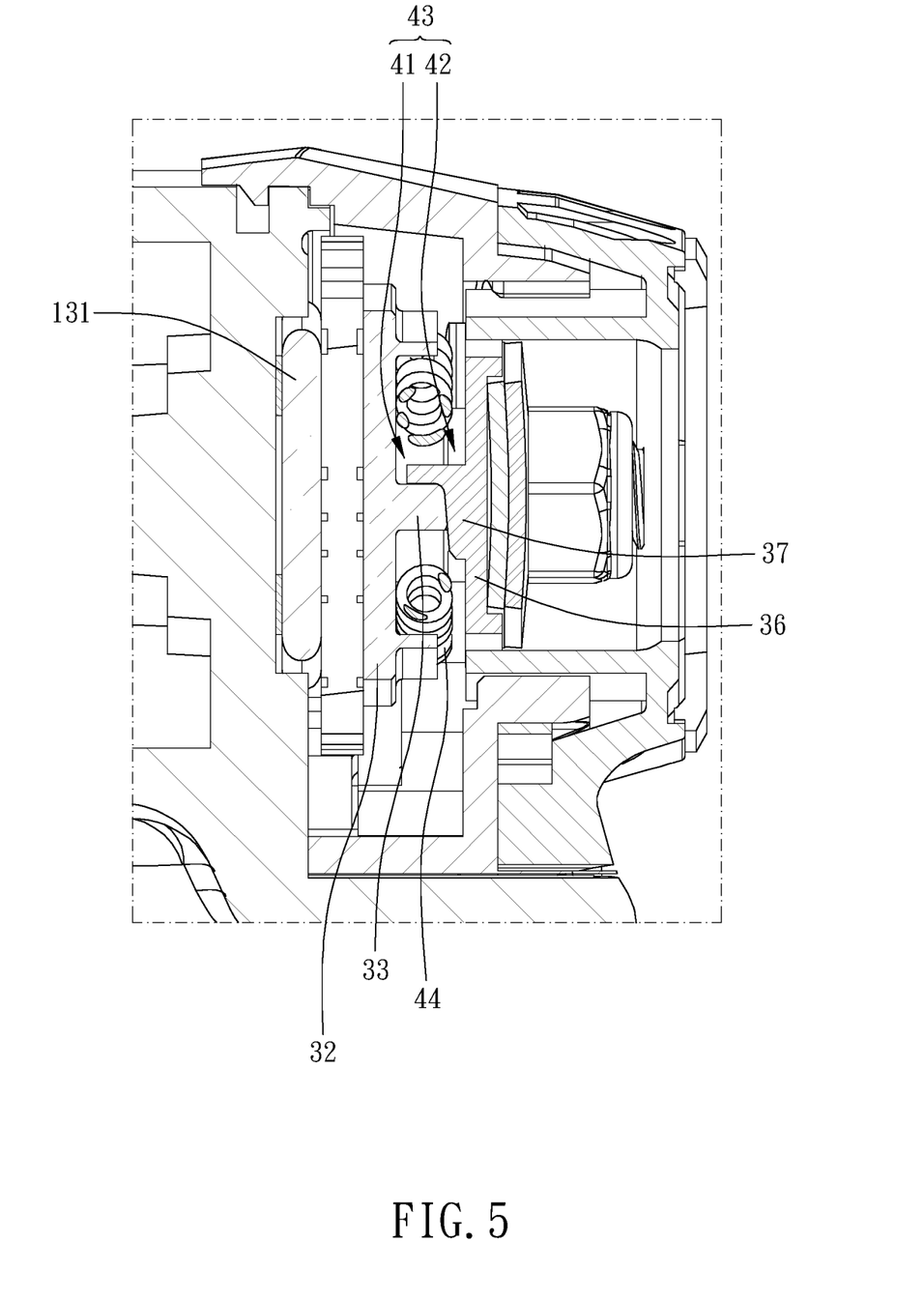
FIG. 5 is a second partial cross-sectional view of a preferable embodiment of the present invention.
Figure 6:
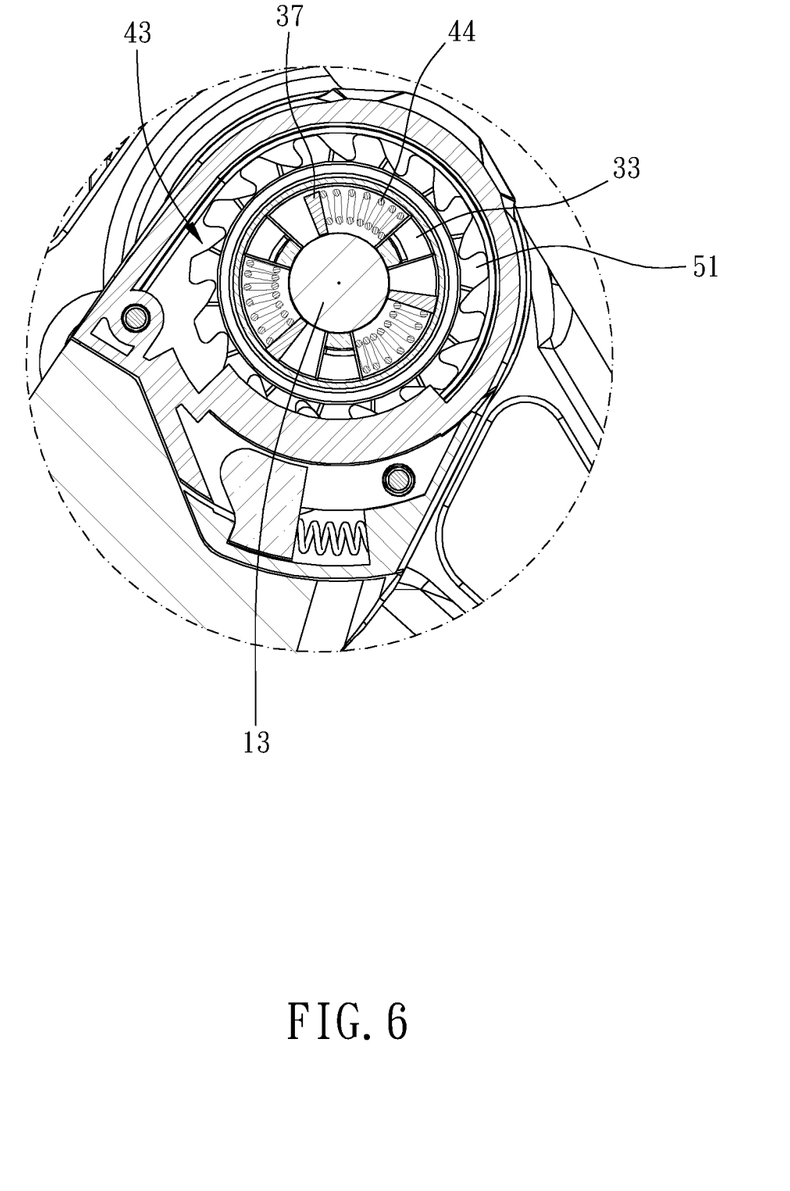
FIG. 6 is a third partial cross-sectional view of a preferable embodiment of the present invention.

Please refer to FIGS. 1 to 6 for a preferable embodiment of the present invention. A rear derailleur of the present invention includes a base 11, a movable member 12, a shaft 13, a chain guide 14, a biasing member 15 and a resistance mechanism.

The base 11 is configured to be mounted to a bicycle, the movable member 12 is rotatably connected to the base 11, the shaft 13 is rotatably connected to the movable member 12, the chain guide 14 is connected to and movable with the shaft 13, and the biasing member 15 is disposed between the chain guide 14 and the movable member 12.

The resistance mechanism is connected to the movable member 12 and configured to apply a frictional resistance to the shaft 13. Specifically, the resistance mechanism includes at least one biasing unit 2, a clutch assembly 3 and a friction applying assembly 5. The clutch assembly 3 is clamped between the at least one biasing unit 2 and the friction applying assembly 5, and the at least one biasing unit 2, the clutch assembly 3 and the friction applying assembly 5 are coaxially sleeved around the shaft 13 and move relative to the shaft 13.

Specifically, the clutch assembly 3 includes a first clutch member 31 and a second clutch member 35 which are relatively rotatable, the first clutch member 31 includes at least one first abutting portion 34, the second clutch member 35 includes at least one second abutting portion 38, the at least one first abutting portion 34 and the at least one second abutting portion 38 are abutted against each other in an axial direction of the shaft 13, and one of the first clutch member 31 and the second clutch member 35 is connected to and movable with the shaft 13. When the chain guide 14 drives the shaft 13 to rotate in a predetermined direction (such as clockwise), an axial extent of the clutch assembly 3 shortens, the at least one biasing unit 2 applies a first resisting force to the clutch assembly 3 and the friction applying assembly 5. When the chain guide 14 drives the shaft 13 to rotate in a direction opposite to the predetermined direction, the axial extent of the clutch assembly 3, and the at least one biasing unit 2 applies a second resisting force to the clutch assembly 3 and the friction applying assembly 5. The second resisting force is larger than the first resisting force so that the larger movement the shaft 13 and the chain guide 14 rotate for in the direction opposite to the predetermined direction, the larger resistance to the shaft 13 and the chain guide 14 is, which restrains the chain guide 14 to swing in the direction opposite to the predetermined direction and effectively prevents chain slacking and chain throwing.

Preferably, the movable member 12 further includes a receiving space 121, and the resistance mechanism is received in the receiving space 121, which can effectively block foreign objects from the outside and ensures the smooth operation of the resistance mechanism.

Specifically, the first clutch member 31 includes a first disc body 32 and at least one first rib 33, the at least one first rib 33 is protrusive beyond the first disc body 32, the second clutch member 35 includes a second disc body 36 and at least one second rib 37, and the at least one second rib 37 is protrusive beyond the second disc body 36. The at least one first abutting portion 34 is disposed on an end face of the at least one first rib 33 remote from the first disc body 32, and the at least one second abutting portion 38 is disposed on an end face of the at least one second rib 37 remote from the second disc body 36.

Specifically, the second clutch member 35 is positioned to and rotatable with the shaft 13 and is rotatable relative to the first clutch member 31. The at least one first abutting portion 34 is inclined to the axial direction of the shaft 13, and the at least one second abutting portion 38 is inclined to the axial direction of the shaft 13, so that the axial extent of the clutch assembly 3 can be shortened or elongated. In this embodiment, the predetermined direction is clockwise. As viewed in a direction opposite to a side of the chain guide 14 and facing toward the shaft 13, the at least one first abutting portion 34 is gradually farther from the chain guide 14 in a counterclockwise direction. As a result, when the second clutch member 35 is driven by the shaft 13 to rotate counterclockwise, the second clutch member 35 and the first clutch member 31 are gradually farther from each other, and the axial active force by the at least one biasing unit 2 to the clutch assembly 3 and the friction applying assembly 5 increases so that the frictional resistance increases, and thus the second clutch member 35 and the shaft 13 are more difficult to rotate counterclockwise, which restrains the chain guide 14 to swing in the direction opposite to the predetermined direction and effectively prevents chain slacking and chain throwing.

In this embodiment, the at least one first rib 33 and the first disc body 32 define at least one first space 41, and the at least one second rib 37 and the second disc body 36 define at least one second space 42; the at least one first space 41 and the at least one second space 42 are in communication with each other and form at least one chamber 43, wherein with the at least one chamber 43 the total weight is reduced. The resistance mechanism further includes at least one elastic member 44, the at least one elastic member 44 is received in the at least one chamber 43, and the at least one elastic member 44 is abutted against and between the first clutch member 31 and the second clutch member 35. When the shaft 13 does not drive the clutch assembly 3 to rotate, the at least one elastic member 44 provides a basic supporting force to the clutch assembly 3 so that the first clutch member 31 and the second clutch member 35 are kept in a stable position.

The friction applying assembly 5 includes a ratchet 51 and a pawl 52, the ratchet 51 is coaxially sleeved with and rotatable with the shaft 13, and the pawl 52 movably is movably disposed on the movable member 12 and meshable with the ratchet 51; when the pawl 52 and the ratchet 51 are meshed with each other, the friction applying assembly 5 applies a third resisting force to the shaft 13 so that the resistance to the shaft 13 rotating in the direction opposite to the predetermined direction is increased. In this embodiment, the shaft 13 includes a supporting portion 131 extending radially, and the ratchet 51 is clamped between the clutch assembly 3 and the supporting portion 131, which provides a stable and strong combination and structure.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A rear derailleur, including:
   a base, configured to be mounted to a bicycle;
   a movable member, rotatably connected to the base;
   a shaft, rotatably connected to the movable member;
   a chain guide, connected to the shaft;
   a biasing member, disposed between the chain guide and the movable member; and
   a resistance mechanism, connected to the movable member and configured to apply a frictional resistance to the shaft, including at least one biasing unit, a clutch assembly and a friction applying assembly, the clutch assembly including a first clutch member and a second clutch member which are relatively rotatable, the first clutch member including at least one first abutting portion, the second clutch member including at least one second abutting portion, the at least one first abutting portion and the at least one second abutting portion being abutted against each other in an axial direction of the shaft, one of the first clutch member and the second clutch member being connected to and movable with the shaft;
   wherein when the chain guide drives the shaft to rotate in a predetermined direction, an axial extent of the clutch assembly shortens, and the at least one biasing unit applies a first resisting force to the clutch assembly and the friction applying assembly, and when the chain guide drives the shaft to rotate in a direction opposite to the predetermined direction, the axial extent of the clutch assembly elongates, and the at least one biasing unit applies a second resisting force to the clutch assembly and the friction applying assembly, wherein the second resisting force is larger than the first resisting force;
   wherein the clutch assembly is clamped between the at least one biasing unit and the friction applying assembly.

2. The rear derailleur of claim 1, wherein the at least one first abutting portion is inclined to the axial direction of the shaft, and the at least one second abutting portion is inclined to the axial direction of the shaft.

3. The rear derailleur of claim 1, wherein the first clutch member includes a first disc body and at least one first rib, the at least one first rib is protrusive beyond the first disc body, the second clutch member includes a second disc body and at least one second rib, and the at least one second rib is protrusive beyond the second disc body; the at least one first abutting portion is disposed on an end face of the at least one first rib remote from the first disc body, and the at least one second abutting portion is disposed on an end face of the at least one second rib remote from the second disc body.

4. The rear derailleur of claim 3, wherein the at least one first rib and the first disc body define at least one first space, and the at least one second rib and the second disc body define at least one second space; the at least one first space and the at least one second space are in communication with each other and form at least one chamber.

5. The rear derailleur of claim 4, wherein the resistance mechanism further includes at least one elastic member, the at least one elastic member is received in the at least one chamber, the at least one elastic member is abutted against the first clutch member and the second clutch member, and when the shaft does not drive the clutch assembly to rotate, the at least one elastic member provides a basic supporting force to the clutch assembly so that the first clutch member and the second clutch member are kept in a stable position.

6. The rear derailleur of claim 1, wherein the at least one biasing unit, the clutch assembly and the friction applying assembly are coaxially sleeved around the shaft.

7. The rear derailleur of claim 1, wherein the movable member further includes a receiving space, and the resistance mechanism is received in the receiving space.

8. A rear derailleur, comprising:
a base, configured to be mounted to a bicycle;
a movable member, rotatably connected to the base;
a shaft, rotatably connected to the movable member;
a chain guide, connected to the shaft;
a biasing member, disposed between the chain guide and the movable member; and
a resistance mechanism, connected to the movable member and configured to apply a frictional resistance to the shaft, including at least one biasing unit, a clutch assembly and a friction applying assembly, the clutch assembly including a first clutch member and a second clutch member which are relatively rotatable, the first clutch member including at least one first abutting portion, the second clutch member including at least one second abutting portion, the at least one first abutting portion and the at least one second abutting portion being abutted against each other in an axial direction of the shaft, one of the first clutch member and the second clutch member being connected to and movable with the shaft;
wherein when the chain guide drives the shaft to rotate in a predetermined direction, an axial extent of the clutch assembly shortens, and the at least one biasing unit applies a first resisting force to the clutch assembly and the friction applying assembly, and when the chain guide drives the shaft to rotate in a direction opposite to the predetermined direction, the axial extent of the clutch assembly elongates, and the at least one biasing unit applies a second resisting force to the clutch assembly and the friction applying assembly, wherein the second resisting force is larger than the first resisting force;
wherein the friction applying assembly includes a ratchet and a pawl, the ratchet is coaxially sleeved with and rotatable with the shaft, and the pawl is movably disposed on the movable member and meshable with the ratchet; when the pawl and the ratchet are meshed with each other, the friction applying assembly applies a third resisting force to the shaft so that the resistance to the shaft rotating in the direction opposite to the predetermined direction is increased.

9. The rear derailleur of claim 8, wherein the shaft includes a supporting portion extending radially, and the ratchet is clamped between the clutch assembly and the supporting portion.

* * * * *